US007607100B2

(12) United States Patent
Perepa et al.

(10) Patent No.: US 7,607,100 B2
(45) Date of Patent: Oct. 20, 2009

(54) METHOD, SYSTEM AND PROGRAM PRODUCT FOR DISPLAY MANAGEMENT OF WEB PAGE PHONE/FAX NUMBERS BY A DATA PROCESSING SYSTEM

(75) Inventors: Bhargav R. Perepa, Austin, TX (US); Sujatha Perepa, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 10/448,239

(22) Filed: May 29, 2003

(65) Prior Publication Data

US 2004/0243939 A1  Dec. 2, 2004

(51) Int. Cl.
*G06F 3/048* (2006.01)
*G06F 3/00* (2006.01)
(52) U.S. Cl. .................. 715/764; 715/234; 715/513; 715/864
(58) Field of Classification Search ................ 715/739, 715/513, 764, 864; 709/203, 205
See application file for complete search history.

(56) References Cited

U.S. PATENT DOCUMENTS

| | | | | |
|---|---|---|---|---|
| 5,796,394 A * | 8/1998 | Wicks et al. | ................. | 715/751 |
| 5,946,647 A * | 8/1999 | Miller et al. | ................... | 704/9 |
| 5,966,652 A * | 10/1999 | Coad et al. | ................ | 455/412.1 |
| 6,359,980 B1 * | 3/2002 | Petrelli et al. | ........... | 379/221.13 |
| 6,405,060 B1 * | 6/2002 | Schroeder et al. | ............ | 455/566 |
| 6,670,968 B1 * | 12/2003 | Schilit et al. | ................. | 715/760 |
| 6,674,453 B1 * | 1/2004 | Schilit et al. | ................. | 715/810 |
| 6,834,048 B1 * | 12/2004 | Cho et al. | .................... | 370/356 |
| 6,870,828 B1 * | 3/2005 | Giordano, III | .............. | 370/352 |
| 6,938,067 B2 * | 8/2005 | Hershenson | ................. | 709/202 |
| 7,043,690 B1 * | 5/2006 | Bates et al. | .................. | 715/533 |
| 7,092,671 B2 * | 8/2006 | Lunsford et al. | ............ | 455/41.2 |
| 7,103,010 B2 * | 9/2006 | Melideo | ...................... | 370/260 |
| 7,162,025 B2 * | 1/2007 | Schnurr | ................. | 379/355.07 |

(Continued)

OTHER PUBLICATIONS

Sawyer, J. et al. "Building Samrt Tags in Microsoft Visual Basic.Net" Oct. 2001.*

(Continued)

*Primary Examiner*—Steven B Theriault
(74) *Attorney, Agent, or Firm*—Matthew W. Baca; Dillon & Yudell LLP

(57) ABSTRACT

A Web browser provides a customized display of phone and fax numbers within a Web page according to user settings. A special phone or fax tag within the Web page file identifies an alphanumeric telephone number within the display (for example, 1-888-IBM-HELP). The telephone number data within the tagged field is converted into a preferred format, as specified at the customization settings page of the Web browser (for example, all numeric 1-888-426-4357). The conversion is preferably displayed upon user indication or activation such as placement of a cursor in proximity to the area occupied by the telephone number within the Web page. A mouse click or keyboard command causes an action within the computer system, as specified within the customization page for the Web browser. For example, by clicking on the telephone number, it is loaded into another software application to connect a telephone call or to send a fax to the telephone number.

12 Claims, 2 Drawing Sheets

U.S. PATENT DOCUMENTS

| | | | |
|---|---|---|---|
| 7,221,936 B2* | 5/2007 | Purdy et al. | 455/417 |
| 2002/0009071 A1* | 1/2002 | Yaary et al. | 370/352 |
| 2002/0069223 A1* | 6/2002 | Goodisman et al. | 707/513 |
| 2002/0083093 A1* | 6/2002 | Goodisman et al. | 707/511 |
| 2002/0143871 A1* | 10/2002 | Meyer et al. | 709/204 |
| 2002/0152255 A1* | 10/2002 | Smith et al. | 709/102 |
| 2003/0088570 A1* | 5/2003 | Hilbert et al. | 707/100 |
| 2003/0117365 A1* | 6/2003 | Shteyn | 345/156 |
| 2003/0152207 A1* | 8/2003 | Ryan | 379/201.04 |
| 2004/0044747 A1* | 3/2004 | Trevor et al. | 709/217 |
| 2004/0049555 A1* | 3/2004 | Schilit et al. | 709/217 |
| 2004/0203954 A1* | 10/2004 | Mikan et al. | 455/466 |
| 2005/0076013 A1* | 4/2005 | Hilbert et al. | 707/3 |
| 2005/0097189 A1* | 5/2005 | Kashi | 709/217 |
| 2006/0034434 A1* | 2/2006 | Kashi | 379/93.07 |
| 2007/0035523 A1* | 2/2007 | Cohen | 345/169 |

OTHER PUBLICATIONS

Cornell, Paul et al. "Developing Smart Tag DLLs" Apr. 2001.*
Egger, Markus Etal. "Regular Expression Support in Microsoft Office System Smart Tags" Aug. 2003.*

* cited by examiner

METHOD, SYSTEM AND PROGRAM PRODUCT FOR DISPLAY MANAGEMENT OF WEB PAGE PHONE/FAX NUMBERS BY A DATA PROCESSING SYSTEM

TECHNICAL FIELD

This invention relates in general to managing web pages in a computer system, and more particularly relates to management by a computer system of telephone and fax numbers contained within a web page.

BACKGROUND

Many Web pages on the World Wide Web display phone and fax numbers to enable telephonic contact with various vendors and organizations maintaining the Web pages. In addition to presenting a pure number representation, telephone numbers are often listed on Web pages using an alphanumeric representation of the telephone number that provides an alternative representation of the telephone number on the 12-button standard telephone keypad. For example, an Internet Web page for the Web page for International Business Machines Corporation at "http://www.ibm.com" displays a telephone number as "1-888-IBM-HELP," instead of using an all-number telephone representation.

Unfortunately, the use of alphanumeric representations of telephone numbers can cause difficulties for end users. Most telephone users are accustomed to using the 12-button keypad when dialing an all-numeric telephone number, but have difficulty locating the correct key corresponding to alphabet letters. For users who are good with numbers, an alphanumeric representation of the phone number is not user friendly and forces the user to do a translation or conversion of the number to a numeric representation before dialing the telephone number. This problem is compounded for users who are unfamiliar with the English language alphabet, and would prefer other native mappings of the 12-button keypad, such as the Indian languages or Chinese or Kanji, etc. One solution to these problems is to display telephone numbers in both numeric and alphabetic, or a mixed alphanumeric format, on each of the Web pages. However, this is a cumbersome solution that unnecessarily takes away valuable display area within the Web page. What is needed is a solution that does not take up additional display area on the Web page and displays telephone numbers in the format preferred by each individual end user.

SUMMARY OF THE INVENTION

In accordance with the present invention, a method, system and program product for managing telephone numbers contained within a web page in accordance with user preferences is provided. An electronic page is displayed to a user, wherein the page includes an element displaying a telephone number in a first representation of the telephone number, and wherein the element is identified to the data processing system by a tag embedded in the page. The telephone number is converted to a second representation of the telephone number in accordance with one or more preferences of the user, in response to the user indicating the element, and the display of the page to the user is modified such that the telephone number is displayed using the second representation.

DETAILED DESCRIPTION OF PREFERRED EMBODIMENTS

Figure 1:
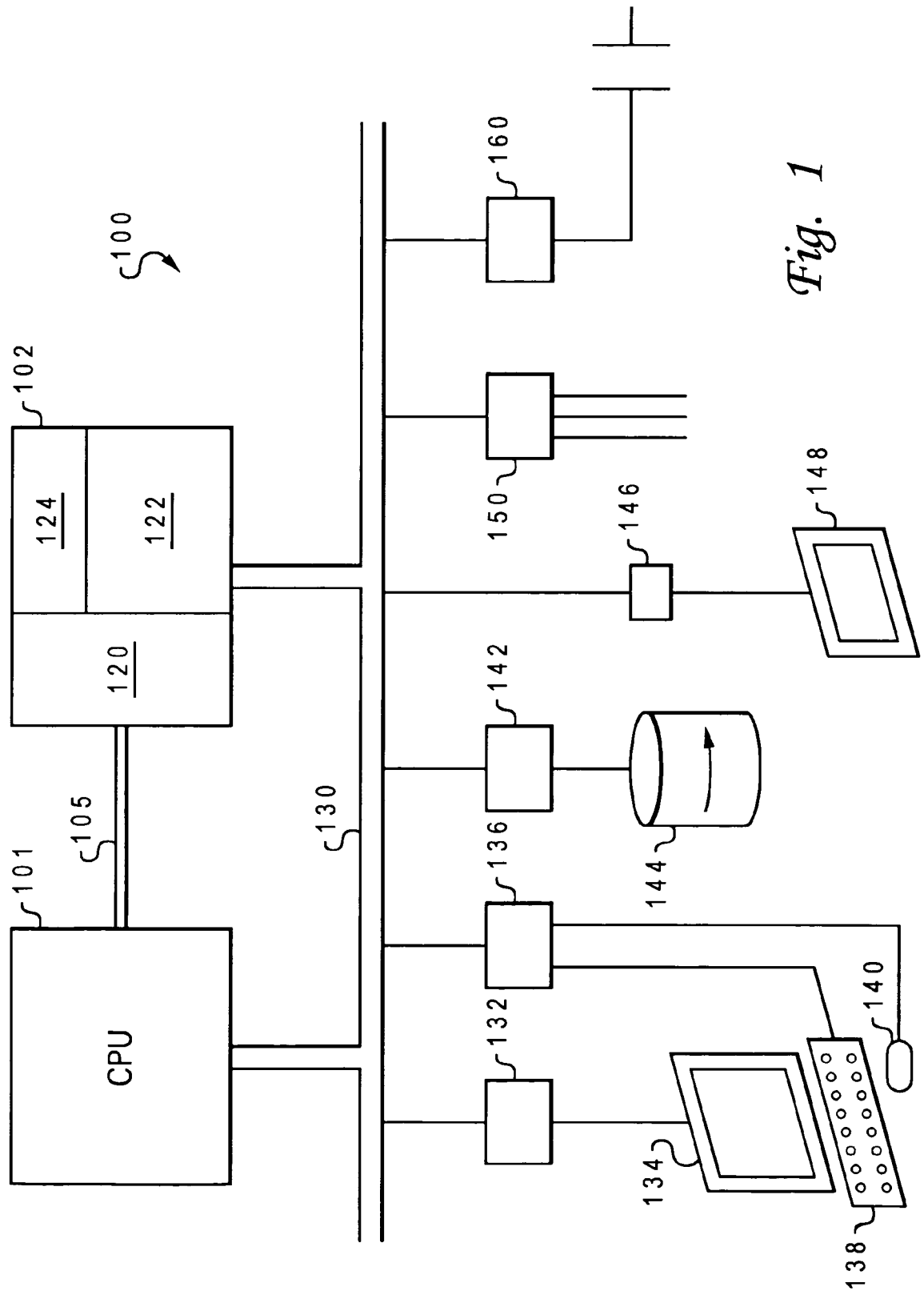
FIG. 1 is a high-level block diagram of a data processing system, which may be a high-level computer system, capable of implementing the preferred embodiment of the invention.

A preferred embodiment of the present invention is directed to software tools and associated methods of managing the display of phone and fax numbers within a Web page to an end user. These software tools and associated methods are embodied within the system software or a user application such as e-mail or a Web browser to provide a customized display of telephone numbers in the Web page. In one preferred embodiment, an end user uses a standard Web browser to access a Web page containing a telephone number, which is displayed in the Web browser in a form and function specified by the user through customized settings within the Web browser. Pursuant to the method of the preferred embodiment, the Web browser recognizes a standardized phone or fax tag within the Web page file, such as a HTML tag within a Hypertext Markup Language ("HTML") file or some other self-describing syntax for other languages such as Extensible Markup Language ("XML"). A conversion tool implemented at the browser level recognizes the phone or fax tag within the file and performs a conversion of the data within the field representing the telephone number into a preferred format for the user, as specified at the customization settings page of the Web browser.

In another preferred embodiment, the conversion is displayed to the user upon user indication or activation such as placement of a cursor in proximity to the area occupied by the telephone number on the display. In still another alternative embodiment, certain user indications such as a mouse click or keyboard command causes a command control to execute an action within the computer system, as specified within the customization page for the Web browser. For example, by clicking on a data element within the Web page representing a telephone number, the telephone number could be loaded into another software application to connect a telephone call or to send a fax to the telephone number. In another example, the Web browser may launch a browser plug-in software application such as an Internet phone application with the telephone number contained in the data element pre-filled into the telephone number field. In still another alternative embodiment, user selection of a data element representing a telephone number causes a simulated telephone keypad to be displayed overlaying the Web page that presents the letters contained within the telephone number to be mapping onto the simulated keypad in the language of choice, as indicated by the user's customization settings in the Web browser.

In alternative embodiments, the software tool providing the device interface client for managing telephone numbers in a Web page can be a Web browser, an e-mail program such as Lotus Notes™ client or Outlook™ client, a Micro Browser for a Personal Digital Assistant (PDA), a User Interface Program in a set top box, or any other type of interface client. In other preferred embodiments, the data processing system receiving the Web page is a cell phone, PDA, two-way pager, web-TV, Satellite TV, e-books, hybrid PDA or other type of computing device. For example, in the cell phone embodiment, the software tool launched upon user indication of the telephone number in the Web page could be the cell phone's operating system, which might automatically add the phone or fax number to a user telephone directory within the device or directly load the telephone number into the cell phone for dialing, all depending upon user-customized settings within the device. In still another preferred embodiment, a device interface client is contained within a hard copy output device such as a printer or fax machine or a digital photocopier, and the phone or fax tags within a Web page file is recognized and is automatically converted to the user's preferred format upon printing of a hard copy of the Web page.

Referring now to the drawings, wherein like numbers denote like parts throughout the several views, FIG. 1 shows a high-level block diagram of a data processing system 100, which may be a high-level computer system, consistent with an embodiment of the invention. A computer system can be considered as three major components: (1) the application programs, such as a spreadsheet or word processing or graphics presentation application, which are used by the user; (2) the operating system that transparently manages the application's interactions with other applications and the computer hardware; and (3) the computer hardware comprising the processor, the random access memories, the actual electronic components which manage the digital bits. The operating system has a kernel which, inter alia, controls the execution of applications, processes, and/or objects by allowing their creation, termination or suspension, and communication; schedules processes/objects of the same or different applications on the hardware, allocates memory for those objects, administers free space, controls access and retrieves programs and data for the user.

The computer hardware of data processing system 100 may comprise central processing unit (CPU) 101, which may be a programmable processor, executing instructions stored in memory 102. While a single CPU is shown in FIG. 1, it should be understood that computer systems having multiple CPUs could be used. Connected to the CPU 101 through an internal bus 105 and/or an external system bus 130 is memory 102. Memory 102 is a random-access semiconductor memory for storing data and programs; thus, the system memory is shown conceptually as a single monolithic entity but it is well known that system memory is often arranged in a hierarchy of caches and other memory devices. Memory 102 contains at least an operating system having a kernel 120 and applications 122. Kernel 120 provides, inter alia, functions such as device interfaces, management of memory pages, management of multiple tasks, etc. as is known in the art. CPU 101 is suitably programmed to execute the kernel 120 and instructions of applications 122 retrieved from memory 102. Memory 102 has the necessary elements to carry out the preferred embodiment by having object attribute tables as described below. Applications 122 may include a server software application, and if so, network interface 160 may interact with the server software application 122 to enable data processing or computer system 100 to be a network server.

Communication bus 130 supports transfer of data, commands and other information between different devices; while shown in simplified form as a single bus, it may be structured as multiple buses, and may be arranged in a hierarchical form. Display adapter 132 supports video display 134 which may be a cathode-ray tube display, a flat panel display, or a touch panel, although other display technologies may be used. Keyboard/pointer adapter 136 supports keyboard 138 and pointing device 140 depicted as a mouse, it being understood that other forms of input devices could be used. Storage adapter 142 supports one or more data storage devices 144 which may be rotating magnetic hard disk drives or CD-ROM drives although other data storage devices could be used. Printer adapter 146 supports printer 148. Adapter 150 may connect a wide variety of devices to the data processing or computer system 100 and to other adapters connected to other devices such as, but not limited to, speakers, audio and visual equipment, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Ultra3 SCSI, Infiniband, FDDI, ATM, 1394, ESCON, wireless relays, USB, Twinax, LAN connections, WAN connections, high performance graphics, etc., as is known in the art.

Communication interface 160 provides a physical interface to a network, such as the Internet. This interface may comprise a modem connected to a telephone line through which an Internet access provider or online service provider is reached, but increasingly other higher bandwidth interfaces are implemented. For example, data processing or computer system 100 may be connected to another network server via a local area network using an Ethernet, Token Ring, or other protocol, the second network server in turn being connected to the Internet. Alternatively, communication interface 160 may be provided through cable television, fiber optics, satellites, wireless, or other connections. Communication interface 160 has capability to communicate with communications systems, such as integrated services digital network (ISDN), plain old telephone service (POTS), or asynchronous digital subscriber line (ADSL). POTS is also known as public telephone switched network (PTSN). The representation of FIG. 1 is intended as an exemplary simplified representation of a high-end computer system, it being understood that in other data processing systems 100, variations in system configuration are possible in addition to those mentioned here.

Finally, data processing system 100 need not be a computer at all, but may be a simpler appliance-like client device, also called an embedded device, having less processing power and memory such as a network terminal, a thin client, a terminal-like device, a voice response unit, etc. The convergence of computing, telecommunications and consumer electronics is causing a tremendous growth in the number and variety of pervasive mobile devices as clients. These mobile architectures enable a multitude of clients including laptops, sub-notebooks, handheld computers such as personal digital assistants and companion devices, and mobile appliances such as smartphones, pagers, simple messaging devices and wearable devices. Thus, when the data processing system 100 is a mobile or an embedded device, the adapters 150 and network interfaces 160 support a variety of multi-modal interfaces including traditional keyboard and mouse interfaces, small text screens, pen, touch screens, speech recognition, text-to-speech and other emerging technologies like wearable devices. Such special-purpose devices for accessing the world wide web, such as an Internet access box for a television set, or a portable wireless web accessing device, which can implement an adapter for the purpose of communicating data to/from another computer system are also intended to be within the scope of a data processing system 100. As will be described in detail below, aspects of the preferred embodiment pertain to a specific method or process having steps implementable on a data processing system 100.

Data processing system 100 can receive Web pages from any device on communication bus 130 but typically receives Web pages from the Internet coupled by communication interface 160. The Internet is a system of geographically distributed computer networks interconnected by computers executing networking protocols that allow users to interact and share information over the networks. More specifically, the World-Wide-Web ("WWW") is a collection of Web servers which support documents formatted as so called "Web pages" for viewing by Web clients. The WWW communications paradigm is based on a conventional client-server model and is facilitated by the use of Web servers which support Internet and Web protocols (e.g. TCP/IP and Hypertext Transfer Protocol ("HTTP")).

A document that is accessible on a World Wide Web site is commonly referred to as a "Web document" or "Web page." A Web page is a computer data file on a host operating a Web server. The Web page may comprise a single line or multiple pages of information and may include any message, name, word, sound, picture, or combination of these elements. Web pages commonly include embedded components, such as GIF (Graphics Interchange Format), JPEG (Joint Photographic Experts Group) and BMP (Bit-Mapped Graphics) files, which are represented within the HTML coding as directory paths within the server memory system or as a network path using Uniform Resource Locators (URL) to provide a reference to the required file.

Most commonly, Web pages are created using a standard coding language called, Hypertext Markup Language ("HTML"), which is a field-based language. HTML along with Extensible Markup Language ("XML") and others are members of a family of computer languages referred to as "markup languages". Markup languages are computer languages which define the format of a text document in a device-independent way. A primary purpose of a markup language, such as HTML, is to provide a protocol for transmitting formatted information and control codes used to instruct a Web browser how to display the contents of the document, including text, images and other support media.

Different fields within the main HTML file are defined to store the formatted information and control code parameters. A HTML document, as well as other types of Web page documents, contains textual tags within the fields indicating a format to be applied, or other action to be taken, relative to document text. These tags are character strings that have defined meanings in the particular markup language being used. Tags not only mark elements, such as text and graphics, but can also be used to construct graphical user interfaces within the Web page (such as buttons that are "depressed" by selecting them using the graphical pointer). Accordingly, HTML is a collection of platform-independent tags, which define the various components of the Web page.

In HTML, a tag is a pair of angle brackets (< >) that contain one or more letters and numbers between the angle brackets. One pair of angle brackets is often placed before an element, and another pair placed after, to indicate where the element begins and ends. For example, the language "<B>TODAY ONLY<B>" uses the "B" tag to provide a boldface formatting code for the words "TODAY ONLY."

Web clients can request Web page documents from a Web server which are then served to the Web clients over the WWW, and are commonly viewed using tools known as Web browsers, which are software programs that are installed on the Web client and which allow users to access and search the Internet. Web browsers may be graphical (such as Netscape Corporation's Navigator™ or Microsoft Corporation's Internet Explorer™) or text based (such as Gopher). In a Web browser, information is displayed along with hypertext links, which identify other WWW, sites.

Figure 2:
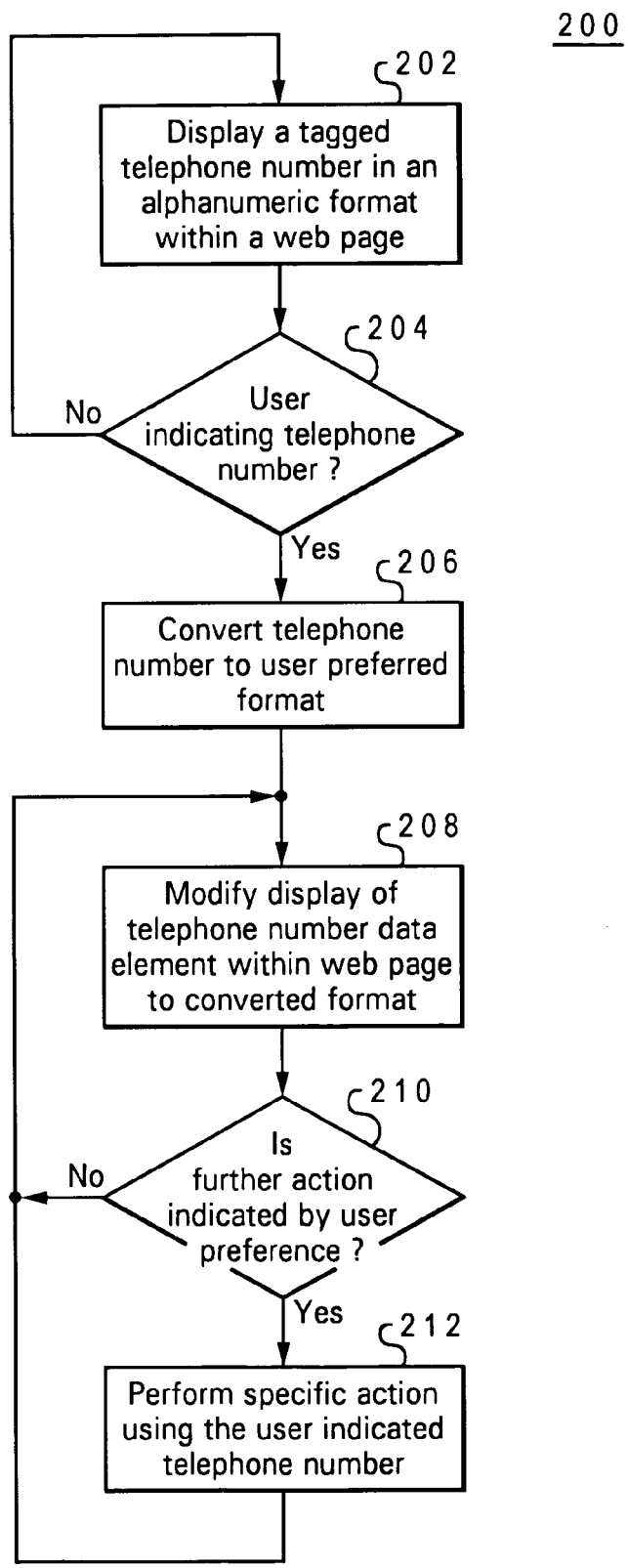
FIG. 2 is a flow diagram of a process within a data processing system for managing the display of telephone numbers contained in a Web page, in accordance with a preferred embodiment of the present invention.

With reference now to FIG. 2, there is shown a flow diagram of a process within a data processing system for managing the display of telephone numbers contained in a Web page, in accordance with a preferred embodiment of the present invention. For example, the process 200 can be implemented by the operating system of an application executing within data processing system 100. In the alternative, the function of process 200 could be implemented by control circuitry through the use of logic gate, programmable logic devices, or other hardware components in lieu of a processor-based system.

The process begins with step 202, when a Web page is displayed on the data processing system that contains a telephone number representing a telephone line for a phone handset or fax machine. The telephone number in the Web page is displayed to the user on an output display using the alphanumeric format provided for the telephone number within the Web page. A telephone number is a string of numbers that identifies a unique telephone line within the public telephone switched network (PTSN). The length of the telephone number varies depending on the country you are calling. In many European countries, phone numbers are variable in length, ranging from just five or six digits in small towns to ten or more in large cities. In the United States, phone numbers are fixed-length, with a total of 10 digits. The 3-3-4 scheme uses three blocks of numbers arranged in two blocks of three and a single block of four digits. The first block is the area code used to designate a specific geographic region, such as a city or part of a state. The next block of numbers is the prefix, which originally referred to the specific switch that a phone line connected to, but now is merely a subset of the area code with the arrival of computerized switches. The last block is the line number assigned at the switch level to a particular phone line. A telephone number is typically dialed on the PTSN using the older pulse, loop disconnect, or rotary form of dialing, or the more modern Touch-tone, Dual Tone Multi-Frequency (DTMF) dialing method.

In accordance with the preferred embodiment, within the Web page document being displayed, the telephone number is tagged using special HTML tags that are reserved for indicating alphanumeric text in a Web page as a telephone number. While in the preferred embodiment the tags are identified for HTML, it should be understood that any type of unique identification could be used to indicate an alphanumeric telephone number within a Web page, and that the present invention is not limited to HTML. For example, the tag may represent some other self-describing syntax for other languages such as Extensible Markup Language ("XML"). As used in herein, the term "tag" shall broadly mean any type of self-describing syntax for any type of language that identifies objects or commands embedded within a Web page and used to generate, transmit or display the Web page.

Referring back to FIG. 2, at step 204, it is determined whether the user has indicated or pointed to the telephone number in the Web page using a user interface device such as a mouse or keyboard. If not, the process returns to step 202, where the tagged telephone number continues to be displayed in the original alphanumeric format provided by the Web page. If the determination at step 204 is that the user has indicated the telephone number such as by placing or focusing the cursor of a graphical user interface pointing device on the telephone number, the process proceeds to step 206, where the telephone number is converted from the format provided by the Web page to a user preferred format, as is indicated in a user preference or customization settings page within the operating system or software application providing the device interface.

Thereafter, the process proceeds to step 208, where the display of the Web page is modified such that the telephone number data element, indicated by the telephone number tags within the Web page, is displayed using the telephone number format specified by the conversion in step 206. At step 210, a decision is made whether further action is indicated by user preferences within the operating system or application. If not, the process returns to step 208 to continue displaying the modified telephone number within the Web page. If the user preferences state that an action should be performed on a telephone number that is indicated by the user, the process proceeds to step 212, where the action specified is performed utilizing the user indicated telephone number. For example, user preferences may indicate that a user indicated telephone number should be loaded into both an Internet phone application and the user's address book contained within the device. A further action might be indicated that the telephone number should be dialed directly upon user indication of the tagged telephone number within the Web page. Thereafter, the process returns to step 208 to continue displaying the modified telephone number.

In an alternative embodiment, the management of Web page phone/fax numbers in accordance with principles of the invention may be implemented as a computer program-product for use with data processing system 100. The programs defining the functions of the preferred embodiment can be delivered to the data processing system 100 and/or to a peripheral device for installation on a connected adapter via a variety of signal-bearing media or computer readable storage media, which include, but are not limited to: (a) information permanently stored on non-write storage media, e.g., read only memory devices within either computer such as CD-ROM disks readable by CD-ROM; (b) alterable information stored on write-able storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments. While the invention has been particularly shown and described with reference to a preferred embodiment, it will be understood by those skilled in the art that various changes in form and detail may be made therein without departing from the spirit and scope of the invention.

What is claimed is:

1. A method in a data processing system for managing telephone numbers contained within a web page, said method comprising:

displaying on a web page a telephone number in an alphanumeric representation having at least one digit of said telephone number substituted by a letter, wherein said letter substitution is based on letter-number groupings on a 12-number telephone keypad, wherein said telephone number is identified to said data processing system by a tag embedded within said web page;

in response to a conversion indication via a cursor hovering over said telephone number in its said alphanumeric representation, converting said alphanumeric representation of said telephone number to an all numeric representation of said telephone number such that all letters of said telephone number in said alphanumeric representation are converted to numbers based on said letter-number groupings on a 12-number telephone keypad;

converting the telephone number from a provided format to a preferred format, wherein the preferred format is indicated in at least one of a preference page and a customization settings page;

enabling one or more actions on the telephone number when one or more activities are indicated in the preference page or the customization settings page, wherein the activities include one or more of: loading the telephone number to an address book and dialing the telephone number;

modifying said web page to display said telephone number in said all numeric representation;

displaying said telephone number in said all numeric representation in a simulated telephone keypad, wherein the simulated telephone keypad is displayed overlaying the web page that displays said telephone number;

displaying said telephone keypad in a language indicated in the customization settings page; and when a hard copy output device is enabled to print a hard copy of the web page, automatically converting said telephone number to the preferred format and printing the preferred format on the hard copy of the web page.

2. The method of claim 1, wherein said 12-number telephone keypad includes numbers 1, 2, 3, 4, 5, 6, 7, 8, 9 and 0.

3. The method of claim 2, wherein said letter-number groupings include

Letters A, B and C being grouped under said number 2,
Letters D, E and F being grouped under said number 3,
Letters G, H and I being grouped under said number 4,
Letters J, K and L being grouped under said number 5,
Letters M, N and O being grouped under said number 6,
Letters P, R and S being grouped under said number 7,
Letters T, U and V being grouped under said number 8, and
Letters W, Y and Y being grouped under said number 9.

4. The method of claim 1, wherein said tag indicates said telephone number is associated with a facsimile machine.

5. A data processing system for managing telephone numbers contained within a web page, said data processing system comprising:

a monitor for displaying on a web page a telephone number in an alphanumeric representation having at least one digit of said telephone number substituted by a letter, wherein said letter substitution is based on letter-number groupings on a 12-number telephone keypad, wherein said telephone number is identified to said data processing system by a tag embedded within said web page;

means for, in response to a conversion indication via a cursor hovering over said telephone number in its said alphanumeric representation, converting said alphanumeric representation of said telephone number to an all numeric representation of said telephone number such that all letters of said telephone number in said alphanumeric representation are converted to numbers based on said letter-number groupings on a 12-number telephone keypad;

means for converting the telephone number from a provided format to a preferred format, wherein the preferred format is indicated in at least one of a preference page and a customization settings page;

means for enabling one or more actions on the telephone number when one or more activities are indicated in the preference page or the customization settings page, wherein the activities include one or more of: loading the telephone number to an address book and dialing the telephone number;

means for modifying said web page to display said telephone number in said all numeric representation;

means for displaying said telephone number in said all numeric representation in a simulated telephone keypad, wherein the simulated telephone keypad is displayed overlaying the web page that displays said telephone number;

means for displaying said telephone keypad in a language indicated in the customization settings page; and when a hard copy output device is enabled to print a hard copy of the web page, means for automatically converting said telephone number to the preferred format and printing the preferred format on the hard copy of the web page.

6. The data processing system of claim 5, wherein said 12-number telephone keypad includes numbers 1, 2, 3, 4, 5, 6, 7, 8, 9 and 0.

7. The data processing system of claim 6, wherein said letter-number groupings include letters A, B and C being grouped under said number 2,
letters D, E and F being grouped under said number 3,
letters G, H and I being grouped under said number 4,
letters J, K and L being grouped under said number 5,
letters M, N and O being grouped under said number 6,
letters P, R and S being grouped under said number 7,
letters T, U and V being grouped under said number 8, and
letters W, X and Y being grouped under said number 9.

8. The data processing system of claim 5, wherein said tag indicates said telephone number is associated with a facsimile machine.

9. A computer readable storage medium having a computer program product for managing telephone numbers contained within a web page, said computer readable medium comprising:

instructions for displaying on a web page a telephone number in an alphanumeric representation having at least one digit of said telephone number substituted by a letter, wherein said letter substitution is based on letter-number groupings on a 12-number telephone keypad, wherein said telephone number is identified to said computer readable medium by a tag embedded within said web page;

instructions for, in response to a conversion indication via a cursor hovering over said telephone number in its said alphanumeric representation, converting said alphanumeric representation of said telephone number to an all numeric representation of said telephone number such that all letters of said telephone number in said alphanumeric representation are converted to numbers based on said letter-number groupings on a 12-number telephone keypad;

instructions for converting the telephone number from a provided format to a preferred format, wherein the preferred format is indicated in at least one of a preference page and a customization settings page;

instructions for enabling one or more actions on the telephone number when one or more activities are indicated in the preference page or the customization settings page, wherein the activities include one or more of: loading the telephone number to an address book and dialing the telephone number;

instructions for modifying said electronic page to display said telephone number in said all numeric representation;

instructions for displaying said telephone number in said all numeric representation in a simulated telephone keypad, wherein the simulated telephone keypad is displayed overlaying the web page that displays said telephone number;

instructions for displaying said telephone keypad in a language indicated in the customization settings page; and when a hard copy output device is enabled to print a hard copy of the web page, instructions for automatically converting said telephone number to the preferred format and printing the preferred format on the hard copy of the web page.

10. The computer readable storage medium of claim 9, wherein said 12-number telephone keypad includes numbers 1, 2, 3, 4, 5, 6, 7, 8, 9 and 0.

11. The computer readable storage medium of claim 10, wherein said letter-number groupings include letters A, B and C being grouped under said number 2,
letters D, E and F being grouped under said number 3,
letters G, H and I being grouped under said number 4,
letters J, K and L being grouped under said number 5,
letters M, N and O being grouped under said number 6,
letters P, R and S being grouped under said number 7,
letters T, U and V being grouped under said number 8, and
letters W, X and Y being grouped under said number 9.

12. The computer readable storage medium of claim 9, wherein said tag indicates said telephone number is associated with a facsimile machine.

* * * * *

UNITED STATES PATENT AND TRADEMARK OFFICE
CERTIFICATE OF CORRECTION

PATENT NO. : 7,607,100 B2 Page 1 of 1
APPLICATION NO. : 10/448239
DATED : October 20, 2009
INVENTOR(S) : Perepa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1228 days.

Signed and Sealed this

Twelfth Day of October, 2010

David J. Kappos
*Director of the United States Patent and Trademark Office*